US010208962B2

(12) United States Patent
Philip et al.

(10) Patent No.: US 10,208,962 B2
(45) Date of Patent: Feb. 19, 2019

(54) GLASS RETAINER BRACKET FOR APPLIANCE DOOR

(71) Applicant: Haier US Appliance Solutions, Inc., Wilmington, DE (US)

(72) Inventors: Elvin Thomas Philip, LaFayette, GA (US); Anthony Michael Shaw, Chattanooga, TN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 86 days.

(21) Appl. No.: 15/601,051

(22) Filed: May 22, 2017

(65) Prior Publication Data
US 2018/0335216 A1 Nov. 22, 2018

(51) Int. Cl.
*F24C 15/04* (2006.01)
*F16M 13/02* (2006.01)
*E06B 5/00* (2006.01)
*E06B 3/54* (2006.01)
*A47J 37/00* (2006.01)

(52) U.S. Cl.
CPC .......... *F24C 15/045* (2013.01); *E06B 3/5481* (2013.01); *E06B 5/00* (2013.01); *F16M 13/02* (2013.01); *A47J 37/00* (2013.01)

(58) Field of Classification Search
CPC ............. F24C 15/04; A47J 37/00; A47J 37/06
USPC ........................................ 126/200, 190, 19 R
See application file for complete search history.

(56) References Cited

U.S. PATENT DOCUMENTS

| 4,110,942 A * | 9/1978 | Slocomb, Jr. ............. E06B 3/22 52/100 |
| 4,253,286 A * | 3/1981 | Katona ................. F24C 15/006 126/198 |
| 6,904,904 B2 * | 6/2005 | Walther ............... F24C 15/006 126/198 |
| 7,014,281 B2 * | 3/2006 | Wuestefeld ......... A47L 15/4265 126/194 |
| 9,674,114 B2 * | 6/2017 | Park ................... G06F 15/17381 |
| 2007/0199664 A1 * | 8/2007 | Zacher ................. E06B 3/5892 160/90 |
| 2007/0204847 A1 * | 9/2007 | Lee ...................... H05B 6/6414 126/200 |
| 2013/0008318 A1 * | 1/2013 | McPherson ............. A47J 36/36 99/341 |
| 2016/0290658 A1 * | 10/2016 | Phillips .................. F24C 7/085 |

FOREIGN PATENT DOCUMENTS

| CN | 202698886 U | 1/2013 |
| CN | 104490292 A | 4/2015 |
| KR | 674721 B1 | 1/2007 |

* cited by examiner

*Primary Examiner* — Gregory Huson
*Assistant Examiner* — Nikhil Mashruwala
(74) *Attorney, Agent, or Firm* — Dority & Manning, P.A.

(57) ABSTRACT

A bracket for retaining glass used to cover the window of a door of an oven appliance and an oven appliance with such brackets. The bracket supports the glass in position at the window. Embodiments of the bracket may provide features including use on either side of the oven door, use of a shorter length of glass, and other features that can facilitate manufacture.

15 Claims, 11 Drawing Sheets

GLASS RETAINER BRACKET FOR APPLIANCE DOOR

FIELD OF THE INVENTION

The subject matter of the present disclosure relates generally to a bracket for retaining glass onto a door of an appliance.

BACKGROUND OF THE INVENTION

Oven appliances commonly include a door for accessing the cooking chamber to insert and remove food items and cooking utensils. To allow the user to view the contents of the cooking chamber without opening the door, a window is typically provided on the door. The window is likely constructed of special glass that e.g., can provide for observation of the cooking chamber while withstanding thermal stresses and providing insulation to prevent heat losses and protect the user.

One conventional approach for securing the glass to the appliance door includes the use of special adhesive tape. Strips of the tape are positioned between the door and the glass to secure the glass in place and prevent rattling as the oven door is open and closed. The tape is designed to withstand the range of oven temperatures while also providing insulation against heat transfer between the window and the door.

In the event the glass is released from the tape, ovens typically include brackets that provide additional support. One or more industry standards may require such brackets. In certain constructions, the bracket extends the full width of the door adding significant weight that, to resist tipping, requires counter weights added towards the rear of the appliance to counterbalance the weight of the window when the door is open. Of course, the full width bracket and counterweights add expense, unwanted weight, and additional manufacturing steps for the appliance.

Additionally, the brackets for these conventional constructions may be provided in pairs with each bracket of the pair being specific to one side of the door. As such, the brackets are not interchangeable. During manufacture, each bracket must be separately inventoried and then properly identified to the appropriate side during the manufacturing process, adding further complexity during manufacturing.

Typically, after placing the glass down onto the oven door, the bracket is installed by placing a portion of the bracket down against the glass. The bracket is then secured to the oven door. The bracket may be constructed from metal or another relatively hard material. Edges or points on the bracket can scratch the glass, compromising its integrity and leading to breaking during periods of thermal stress.

Accordingly, a bracket for an appliance door that can retain the glass for a window of the door would be useful. Such a bracket than can be used interchangeably on either side of the door would be helpful. A bracket that can also allow for the use of shorter glass so as to lessen the weight of the door would also be beneficial. A bracket that may also be readily manufactured and can include additional features to facilitate installation would be useful.

BRIEF DESCRIPTION OF THE INVENTION

The present invention provides a bracket for retaining glass used to cover the window of a door of an oven door appliance. The bracket supports the glass in position at the window. Embodiments of the bracket may provide features including interchangeable use on either side of the oven door and other features that can facilitate manufacture. The present invention also includes an appliance having such brackets. Additional aspects and advantages of the invention will be set forth in part in the following description, or may be apparent from the description, or may be learned through practice of the invention.

In one exemplary embodiment, the present invention provides a bracket for glass positioned over a window of a door of an appliance. The bracket includes a main body for positioning against the door, the main body having a planar portion. A pair of opposing shelves located on opposing sides of the planar portion, each shelf projecting from one of the opposing sides along a transverse direction that is orthogonal to the planar portion of the main body. A pair of tabs located on opposing sides of the planar portion, each tab connected to one of the opposing shelves, each tab projecting along a vertical direction away from one of the shelves and parallel to the planar portion of the main body. A connector plate attached to the main body and projecting along the transverse direction. The connector plate defining a central aperture. An anti-rotation tab attached to the connector plate and projecting along a lateral direction orthogonal to the transverse direction.

In another exemplary embodiment, the present invention provides an oven appliance that includes a cabinet enclosing a cooking chamber for the receipt of food items for cooking. The cabinet defines lateral, transverse, and vertical directions mutually orthogonal to one another. A door provides for selectively accessing the cooking chamber. The door is pivotally connected to the cabinet. The door defines an opening whereby the cooking chamber may be viewed from an exterior. The door has an interior surface and a pair of opposing sides extending along the vertical direction. A pane is positioned at the opening, the pane having a bottom edge. A pair of brackets are positioned at the bottom edge of the pane, each bracket positioned along one of the opposing sides of the door.

For this embodiment, each bracket includes a main body for positioning against the interior surface of the door. A pair of opposing shelves are located on opposing sides of the main body, each shelf projecting from one of the opposing sides along the transverse direction. At least one of the shelves contacts the bottom edge of the pane. A pair of tabs are located on opposing sides of the main body. Each tab is connected to one of the opposing shelves. Each tab projects along the vertical direction away from one of the shelves. A connector plate is attached to the main body and projects along the transverse direction. The connector plate defines an aperture. An anti-rotation tab is attached to the connector plate and projects along the lateral direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
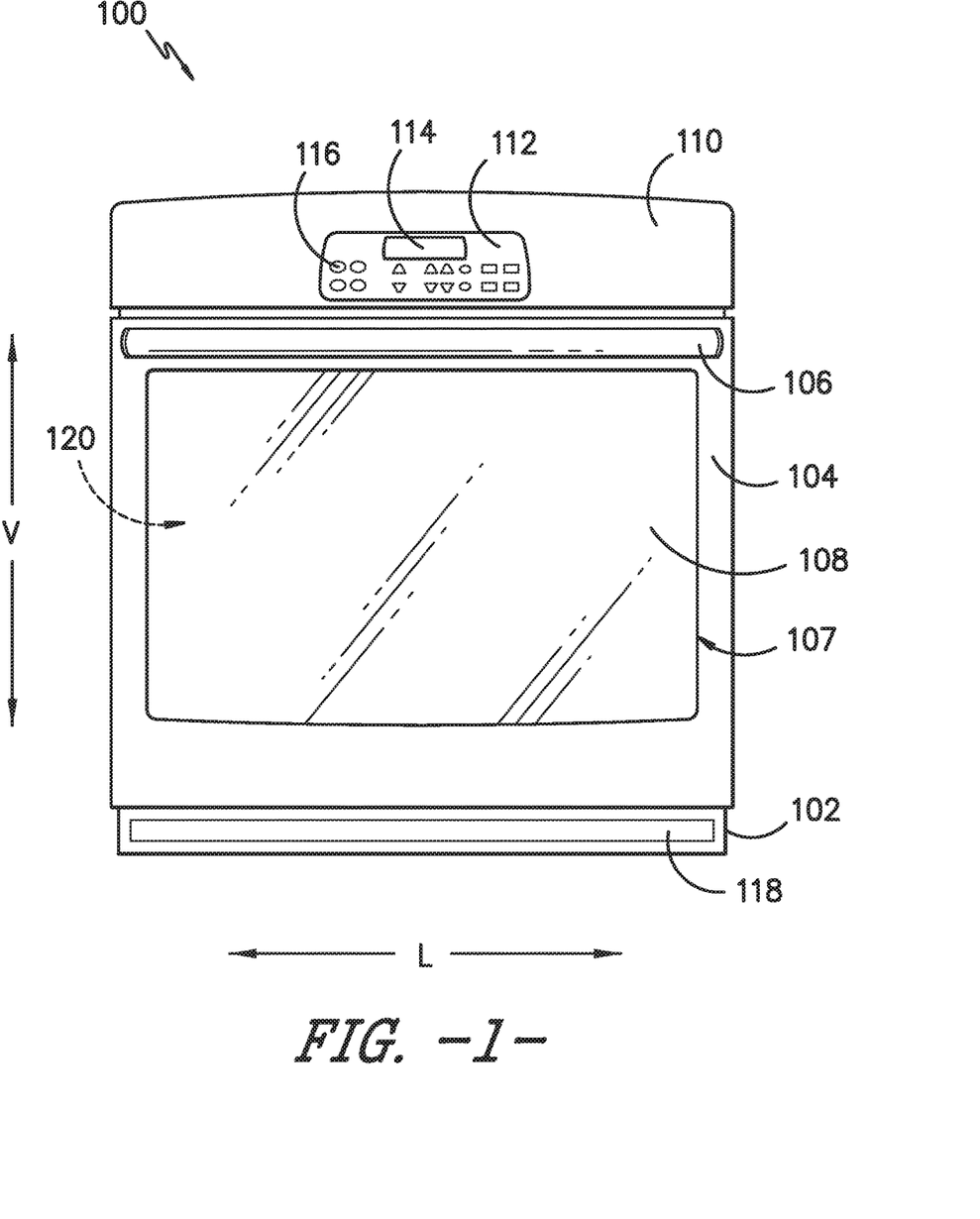
FIG. 1 provides a front view of an exemplary oven appliance of the present invention.

FIG. 1 provides a front view of an exemplary oven 100 of the present invention. Oven 100 includes cabinet 102 having a cooking chamber 120 into which food items may be inserted and removed for cooking operations. Oven 100 defines mutually orthogonal directions referenced with arrows as vertical direction V, lateral direction L, and transverse direction T (FIG. 3), which will be used in describing the invention.

A door 104 is pivotally connected to cabinet 102 (or a frame used with or instead of cabinet 102) for purposes of opening and closing cooking chamber 120 using handle 106. Door 104 defines an opening 107 whereby the cooking chamber 120 may be viewed by a user from the exterior of oven 100. Ventilation opening 118 provides for a flow of air into oven 100 depending upon e.g., the mode of operation.

A pane 108 or glass is positioned over opening 107 to enclose heat and various gases in cooking chamber 120 during cooking operations while still allowing a user to view cooking chamber 120 when door 104 is closed. Pane 108 is constructed from materials that resist thermal shock and breaking from use of oven 100. While only a single pane 108 is shown, it should be understood that more than one pane may be used with exemplary embodiments of the present invention.

Oven 100 includes a user interface panel 110 having a user interface 112. Various controls or buttons 116 allow a user to control oven 100. A display 114 provides information regarding cooking operations e.g., temperature, time, mode of operation, and others.

Oven 100 is provided by way of example only. Using the teachings disclosed herein, one or ordinary skill in the art will understand that other oven appliances may be used with the present invention. For example, a double oven and ovens with different controls and aesthetic features may also be used.

Figure 2:
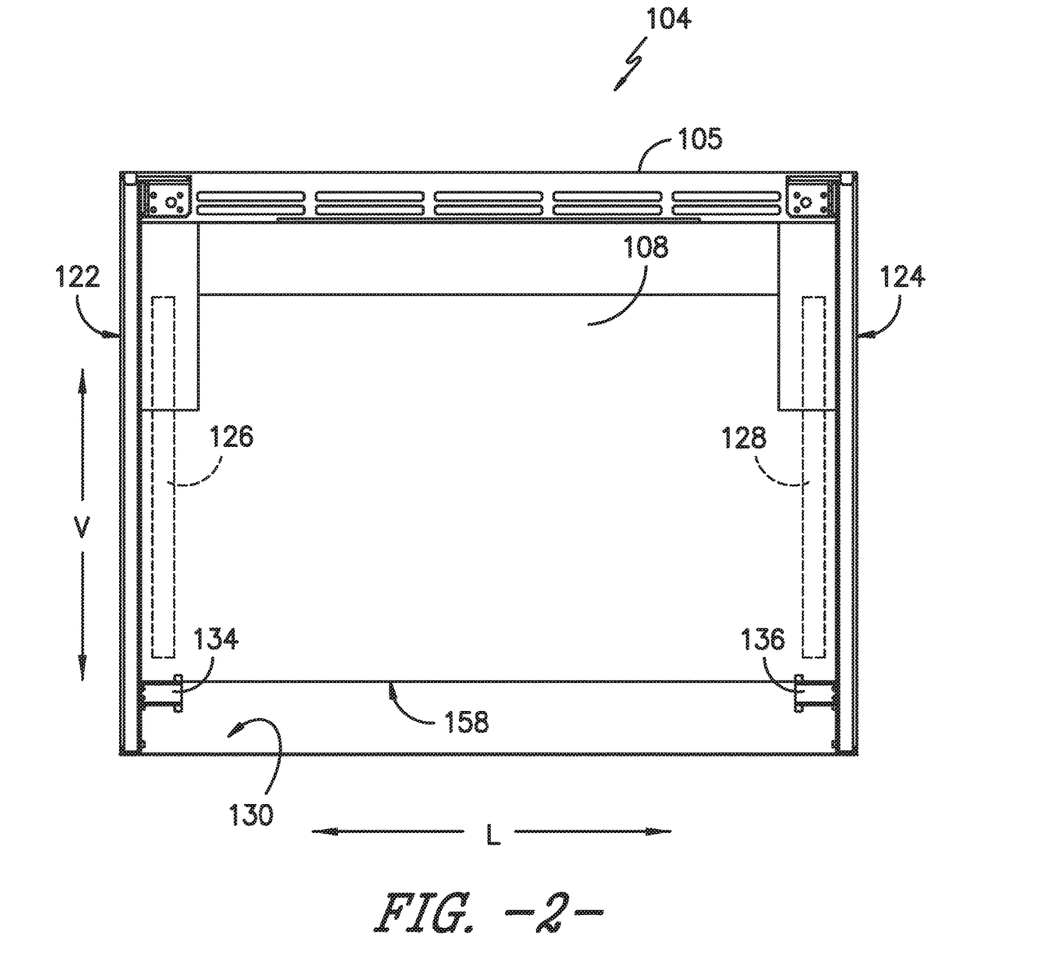
FIG. 2 is a rear view of a front panel of an exemplary door as may be used with the oven of FIG. 1.

For this exemplary embodiment, door 104 is constructed from panels e.g., front and rear panels. FIG. 2 provides a rear view of a front panel 105 of door 104. The view is of the side of front panel 105 that faces cooking chamber 120 when door 104 is in the closed position. A rear panel has been removed from door 104 for purposes of illustration. Pane 108 extends along lateral direction L between opposing sides 122, 124 of door 102. Door 104 includes thermal tape 126 and 128 that helps secure panel 108 in place over opening 105. A pair of brackets 134, 136 are positioned at bottom edge 158 of pane 108 against interior surface 130 of front panel 105. Bracket 134 is positioned along opposing side 122 while bracket 136 is positioned along opposing side 124. Brackets 134, 136 can help support the weight of pane 108 while also ensuring that pane 108 remains in place in the event that thermal tape 126 or 128 fails. Specifically, brackets 134, 136 resist movement of pane 108 along transverse direction T or vertical direction V should tape 126 or tape 128 fail.

Brackets 134 and 136 are identical in construction—each can be used interchangeably on either side 122 or 124 of door 104. As such, a manufacturer is not required to maintain a supply of different brackets for each side 122 and 124 of door 104 and assembly is simplified. FIGS. 3 through 8 provide various views of brackets 134 and 136. As the construction of brackets 134 and 136 is identical, bracket 134 will be used for purposes of description and illustration. Additionally, bracket 134 will be described with reference to orientation and directions it would have when door 104 is in a closed position on oven 100.

Figure 3:
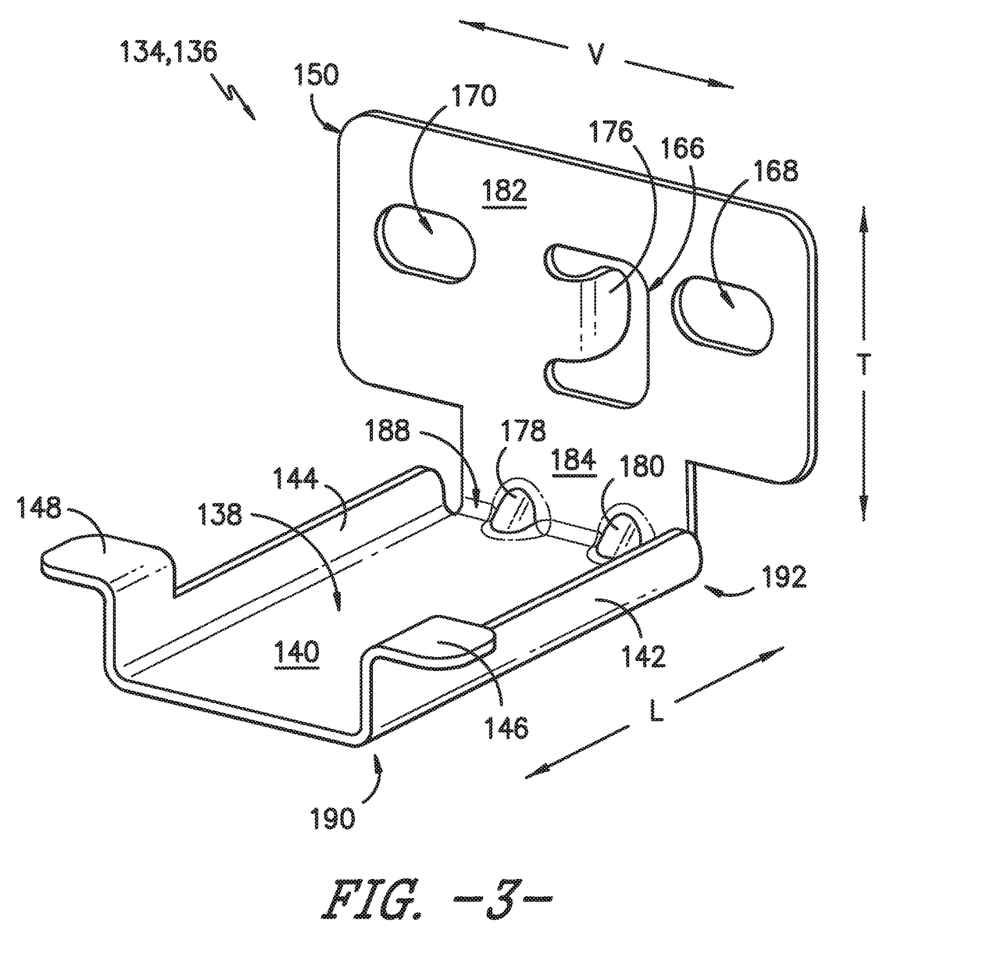
FIG. 3 is a perspective view of an exemplary bracket of the present invention.

Bracket 134 includes a main body 138 for positioning against interior surface 130. Main body 138 has a planar portion 140 that lies within a plane including vertical direction V and lateral direction L when door 104 is in a closed position on appliance 100. Main body extends along lateral direction L between a first end 190 and an opposing, second end 192.

A pair of opposing shelves 142 and 144 are located on opposing sides (along vertical direction V) of planar portion 140 of main body 138. Each shelf 142 and 144 projects from one of the opposing sides along transverse direction T and orthogonal to planar portion 140. For this exemplary embodiment, each shelf 142, 144 has a length S that extends in lateral direction L along an entirety of main body 138.

Bracket 134 includes a pair of tabs 146 and 146 located on opposing sides (along vertical direction V) of planar portion 140 of main body 138. Each tab 146, 148 is connected with one of the opposing shelves 142, 144, respectively. Tabs 146, 148 project in opposing directions along vertical direction V away from shelves 142, 144, respectively. Each tab 146, 148 is parallel to planar portion 140 of main body 138. Tabs 146, 148 are located at the first end 190 of main body 138. Each tab 146, 146 has a width $W_T$ (FIG. 6) along lateral direction L for only a portion of the entirety of the length S of main body 138.

Figure 5:
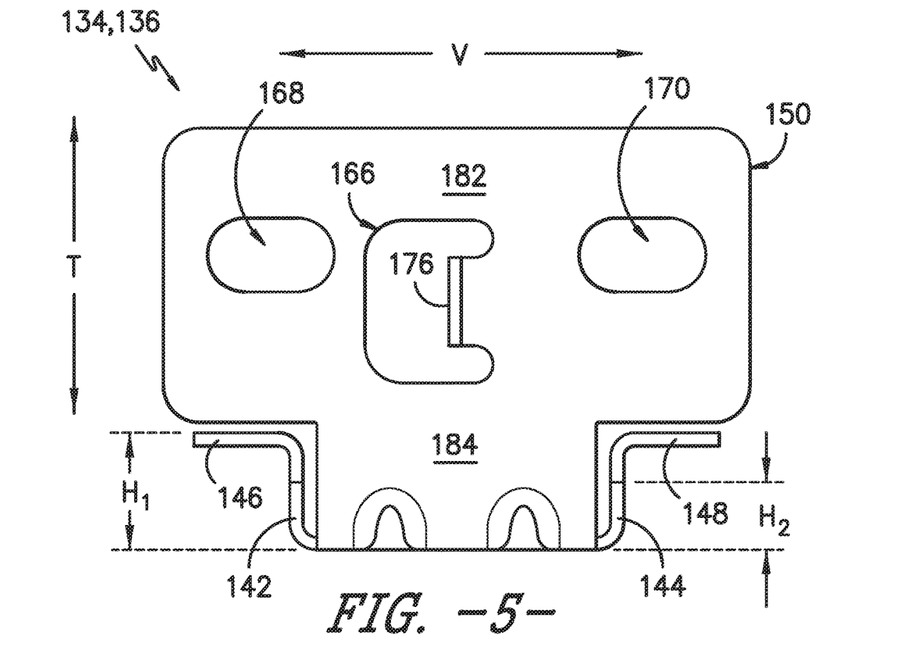
Figure 6:
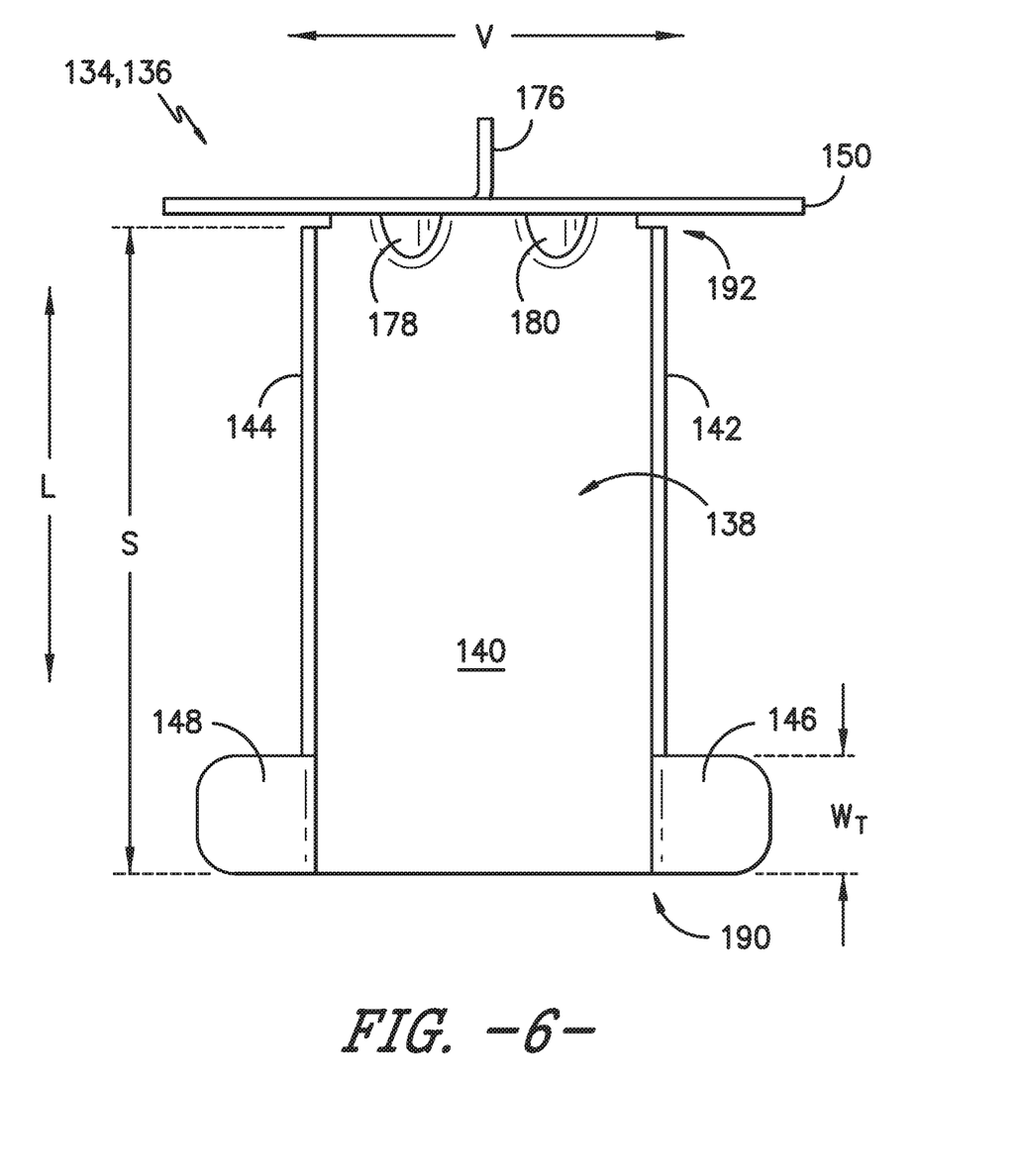
FIG. 6 is a top view of the exemplary bracket of FIG. 3.
Figure 7:
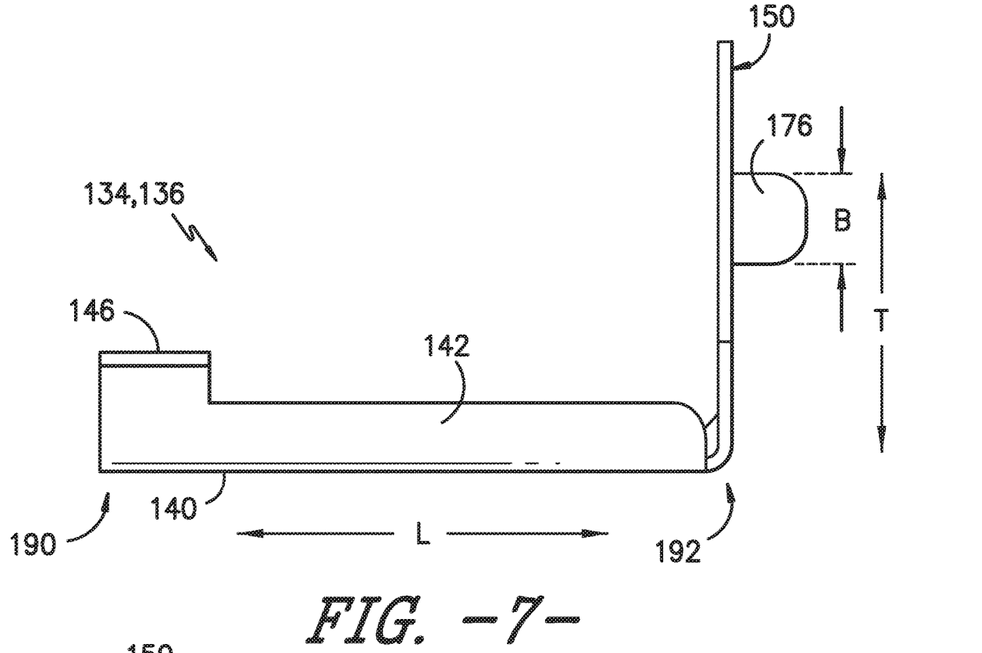
FIG. 7 is a side view of the exemplary bracket of FIG. 3.
Figure 8:
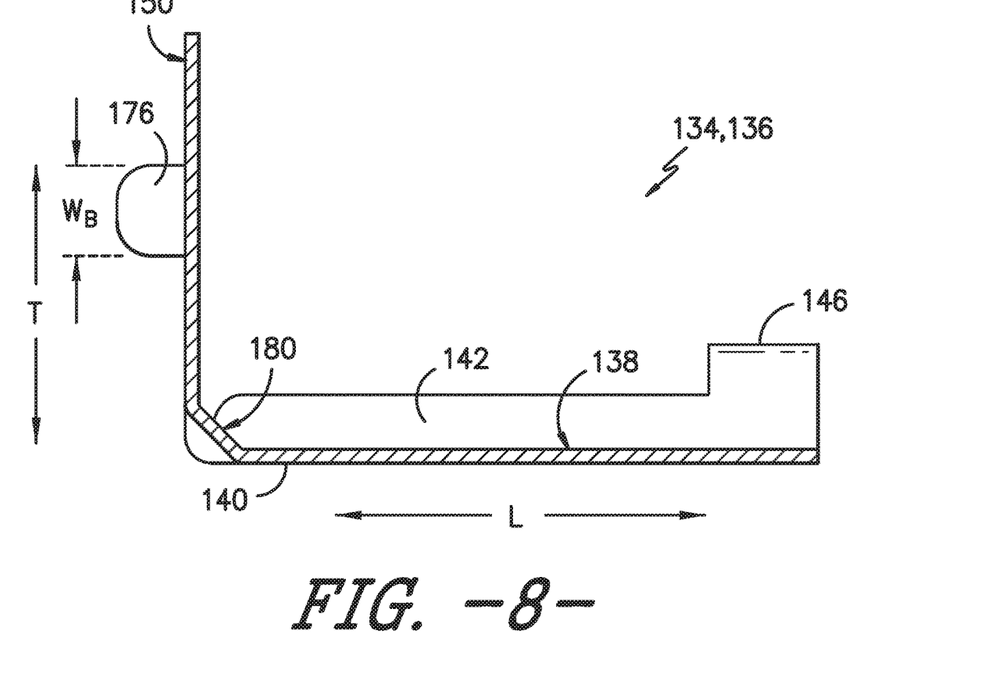
FIG. 8 is an opposing, cross-sectional side view of the exemplary bracket of FIG. 3 taken along line 8-8 of FIG. 4.

Referring now to FIG. 5, tabs 146 and 148 are separated along transverse direction T by a distance $H_1$ from planar portion 140 of main body 138 and both lie in the same plane that includes vertical direction V and lateral direction L. Shelves 142, 144 extend along transverse direction T by an amount $H_2$. For this exemplary embodiment, $H_1$ is greater than $H_2$.

Figure 4:
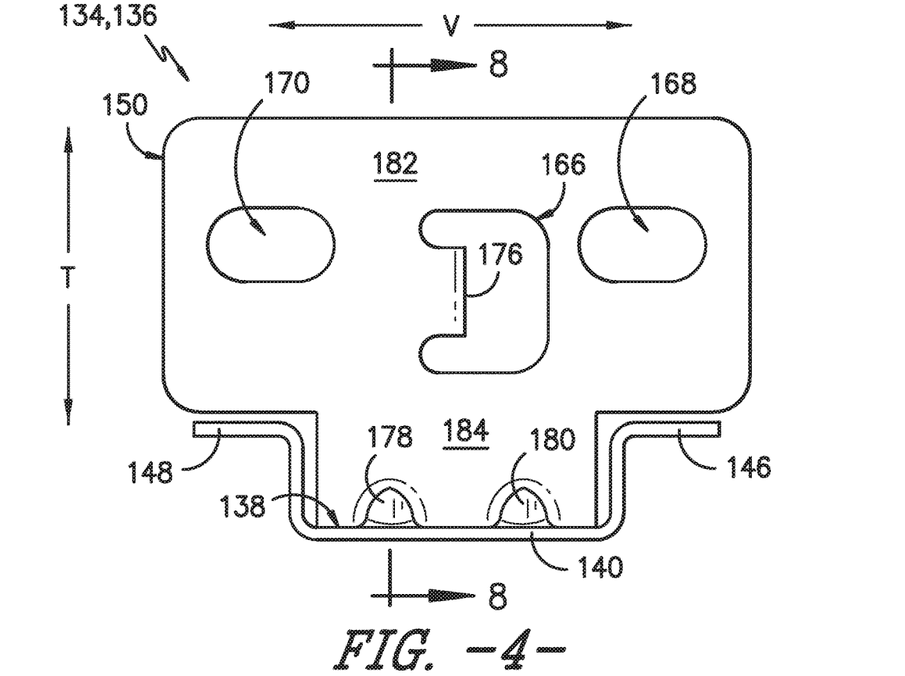
FIGS. 4 and 5 are end views of the exemplary bracket of FIG. 3.

A connector plate 150 is located at second end 192 of main body 138 and is attached thereto. Connector plate 150 projects along transverse direction T from main body 138 forming corner 188. As shown in FIGS. 3, 4, and 5 the height of connector plate 150 is greater than the height of any portion of main body 138 in this embodiment. A pair of stiffeners 178 and 180 are located at corner 188 for reinforcement. A different number may be used in other embodiments. Connector plate 150 includes a planar body portion 182 connected to main body 138 by an arm portion 184. As shown in e.g., FIGS. 4 and 5, body portion 182 is wider along vertical direction V than arm portion 184. Both portions 182 and 184 lie in a plane that includes vertical direction V and transverse direction T when door 104 is in a closed position.

A central aperture 166 is defined by connector plate 150. For this exemplary embodiment, central aperture 166 is located at the center of plate 150 along vertical direction V. An anti-rotation tab 176 having width $W_B$ (FIG. 8) along transverse direction T is connected to connector plate 150. Tab 176 projects along lateral direction L in a manner orthogonal to planar body portion 182 of plate 150. A pair of fastener apertures 170, 172 are positioned on connector plate 150 on opposing sides along vertical direction V of central aperture 166. For this embodiment, each fastener aperture 170, 172 is elongated along vertical direction V.

Figure 9:
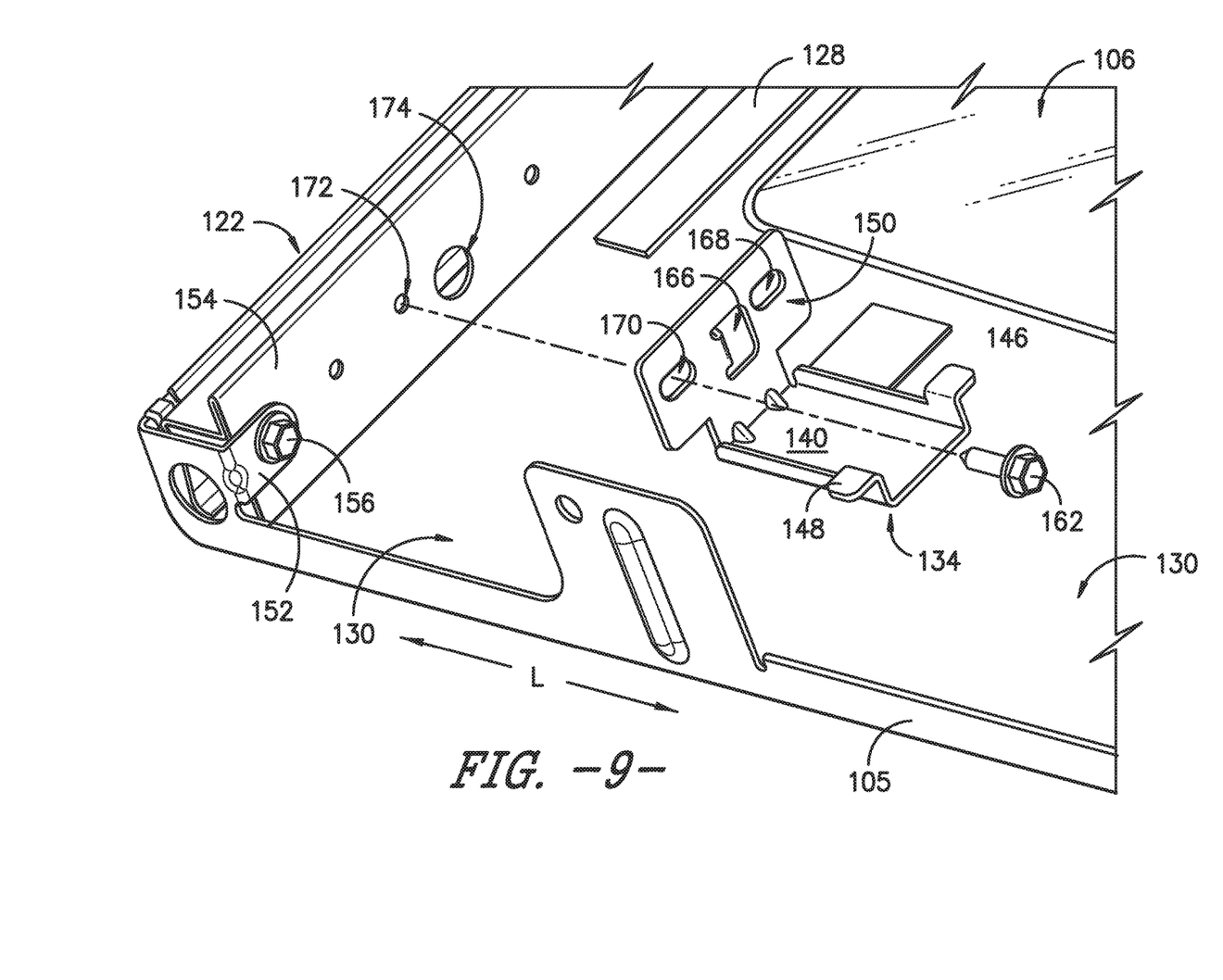
FIG. 9 is a partial perspective view of an exemplary bracket installation onto the rear of the front panel of FIG. 2.
Figure 10:
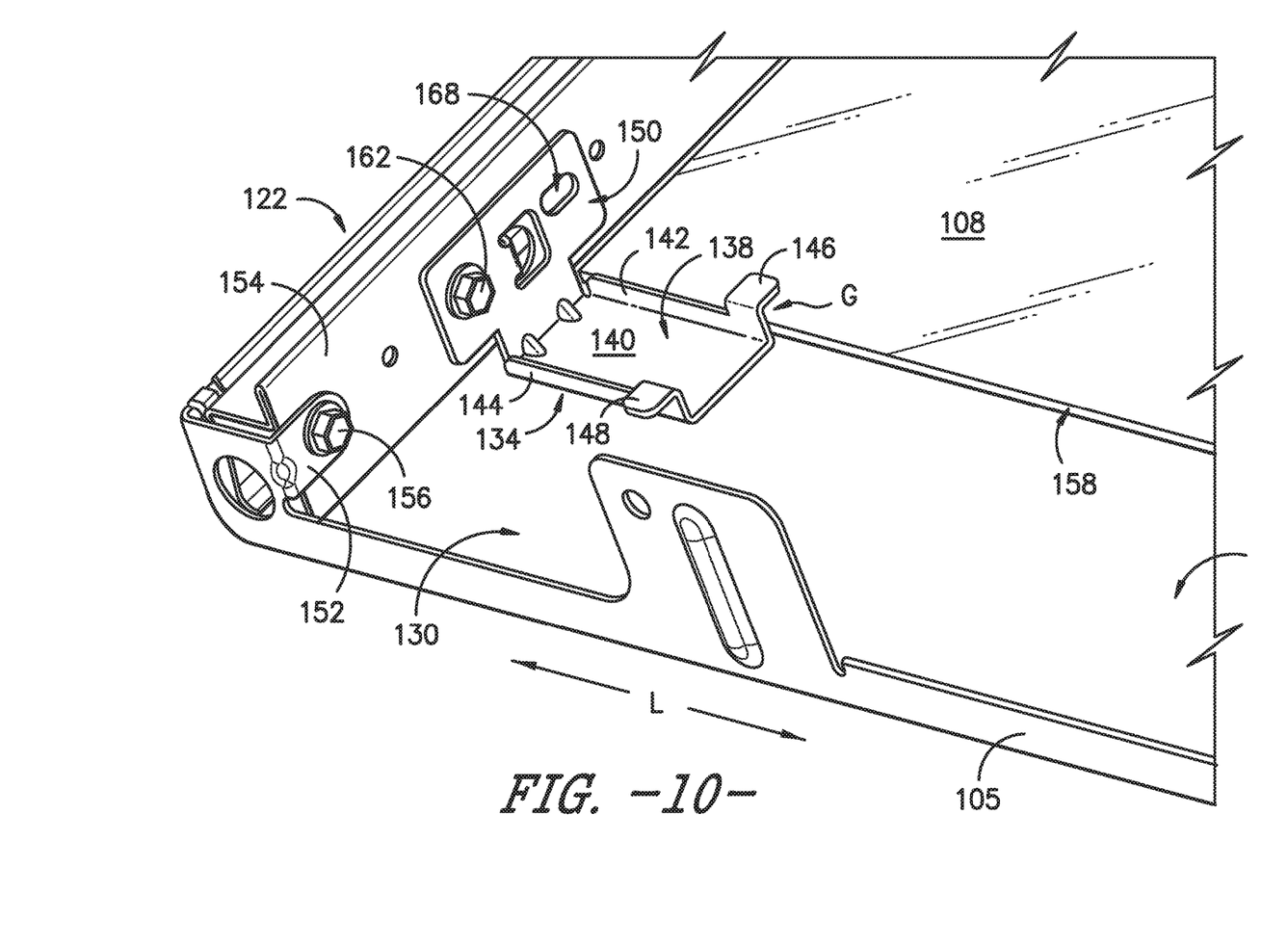
FIGS. 10, 11, 12, and 13 depict various view of the exemplary bracket after installation.
Figure 11:
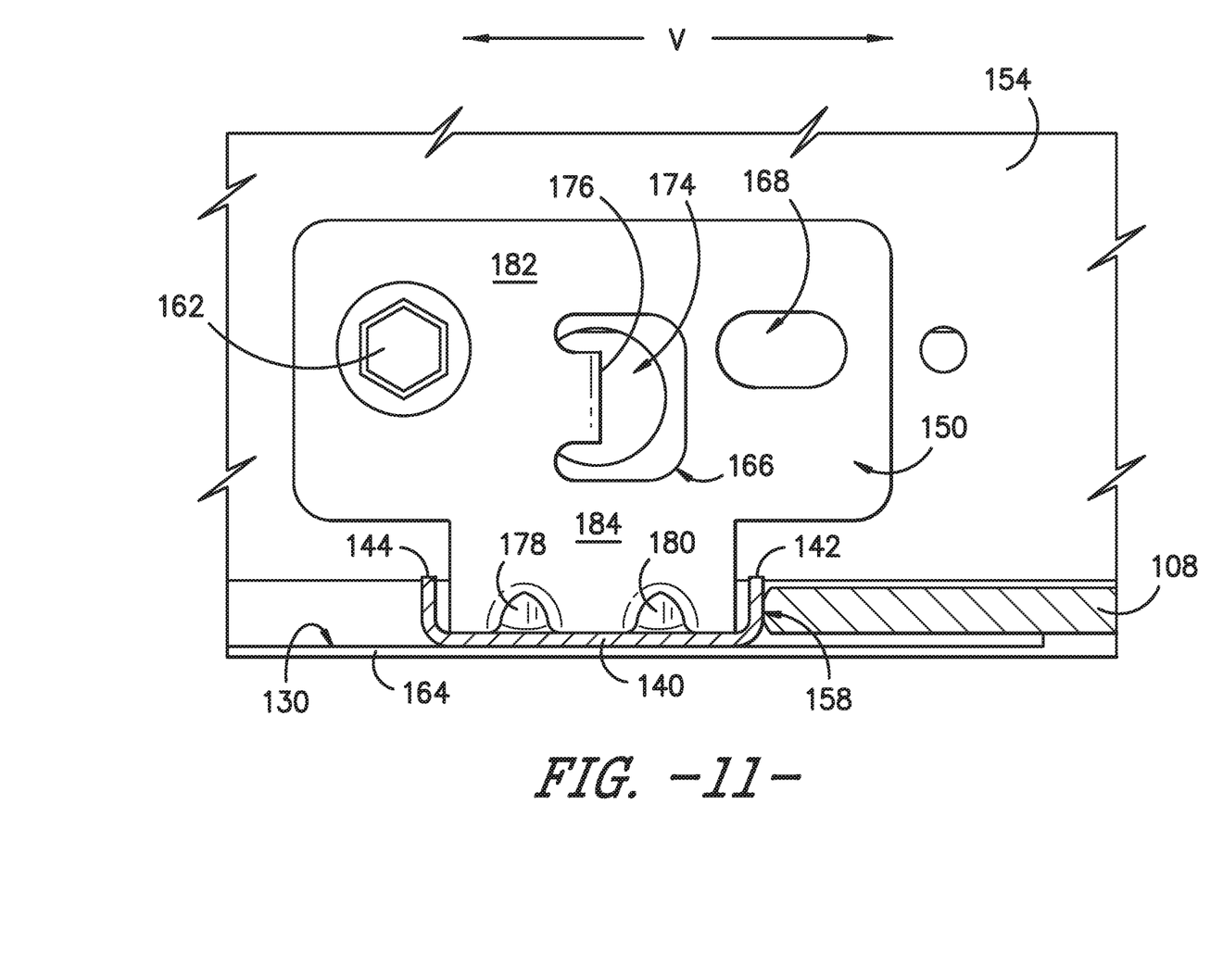
Figure 12:
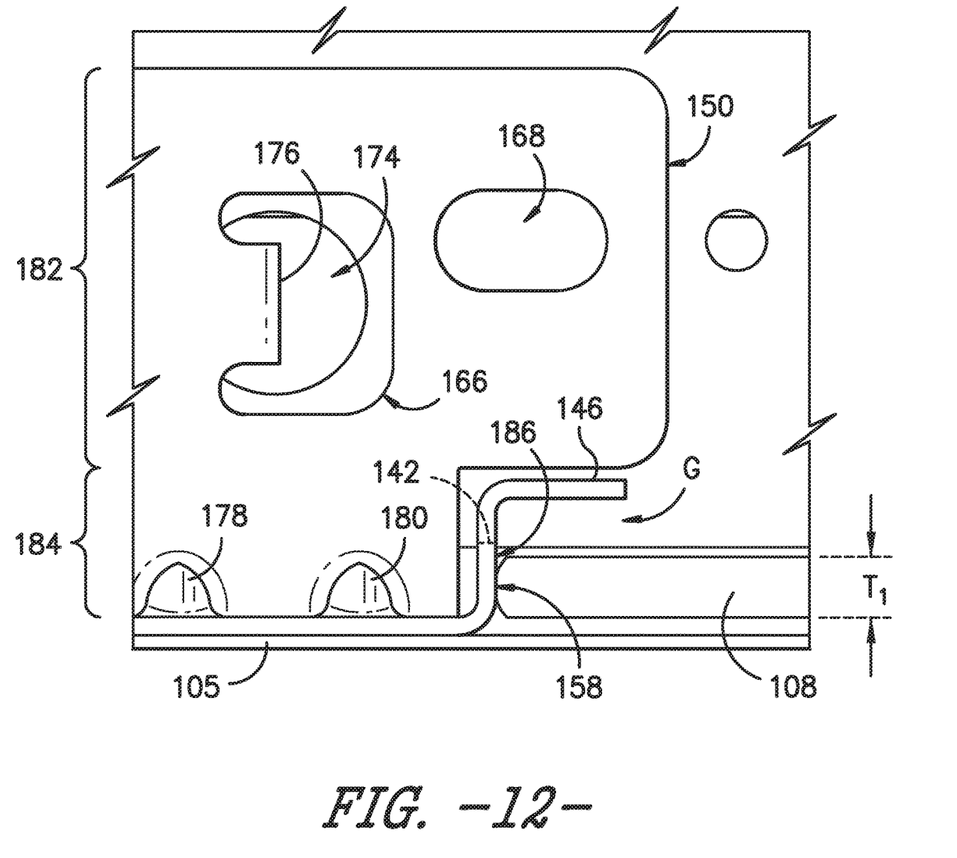
Figure 13:
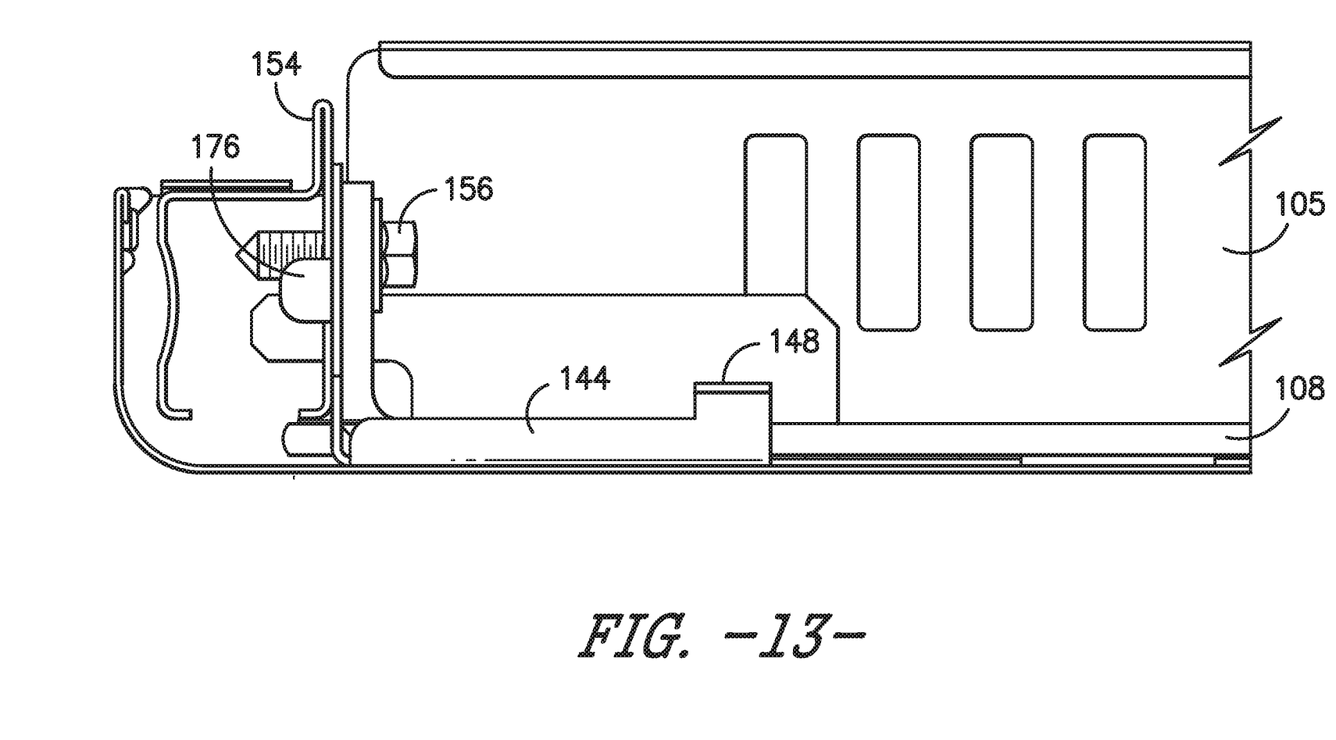

FIG. 9 illustrates bracket 134 and front panel 105 in an exploded position while FIGS. 10 through 13 show bracket 134 after installation. Front panel 105 of door 104 includes a post 154 extending vertically along each side 122 and 124. Post 154 is secured in part by fastener 156 inserted through tab 152. During assembly, pane 108 is placed over opening 107 onto tape strips 126, 128 on door 104. Bracket 134 is then positioned onto post 154 as anti-rotation tab 176 is inserted into anti-rotation opening 174 in post 154 (FIGS. 9 and 13). A fastener 162 is then inserted through fastener aperture 170 of bracket 134 and secured into fastener aperture 172 of post 154.

The same process of installing bracket 134 is used for installing bracket 136 on side 124 of door 104 using fastener aperture 168 instead of fastener aperture 170. For both brackets 134 and 136, anti-rotation tab 176 and opening 174 assists with properly locating brackets 134 and 136 during assembly. For bracket 136, anti-rotation tab 176 also prevents bracket 136 from rotating out of position as fastener 162 is secured by apply torque thereto.

Referring to FIGS. 5 and 12, height $H_1$ is greater than the thickness $T_1$ of glass 108. As such, when brackets 134, 136 are placed against front panel 105, tabs 146 and 148 do not come into contact with glass 108. Instead, tabs 146, 148 are separated from glass 108 by a small gap G. As such, during assembly, gap G helps prevent brackets 134 and 136 from scratching or otherwise damaging glass 108. At the same time, as shown in e.g., FIGS. 11 and 12, glass 108 is supported by brackets 134 and 136, and tabs 146 and 148 help maintain the position of glass 108 within door 104 should tape 126 or 128 fail.

As will be understood by one or ordinary skill in the art using the teachings disclosed herein, the present invention does not require brackets having the same appearance as brackets 134 and 136. One or more of the same features described herein may be provided in a bracket of the invention having a significantly different appearance. For example, the relative length and width of various components of bracket 134 may be altered will still falling within the claims that follow.

In another exemplary embodiment of the invention, a single bracket 134 or 136 may be used on either side 122 or 124 of door 104. Each bracket 134 or 136 is sufficient by itself to provide support for glass 108.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A bracket for glass positioned over a window of a door of an appliance, comprising:
   a main body for positioning against the door, the main body having a planar portion;
   a pair of opposing shelves located on opposing sides of the planar portion, each shelf projecting from one of the opposing sides along a transverse direction that is orthogonal to the planar portion of the main body;
   a pair of tabs located on opposing sides of the planar portion, each tab connected to one of the opposing shelves, each tab projecting along a vertical direction away from one of the shelves and parallel to the planar portion of the main body;
   wherein the tabs project in opposite directions from each other and are coplanar;
   a connector plate attached to the main body and projecting along the transverse direction, the connector plate defining a central aperture; and
   an anti-rotation tab attached to the connector plate and projecting along a lateral direction orthogonal to the transverse direction.

2. The bracket of claim 1, wherein the anti-rotation tab is positioned adjacent to the central aperture.

3. The bracket of claim 2, further comprising a pair of fastener apertures positioned on opposite sides of the central aperture.

4. The bracket of claim 3, wherein each fastener aperture is elongated along a vertical direction that or orthogonal to the lateral and transverse directions.

5. The bracket of claim 4, wherein each of shelves has a length that extends in the lateral direction along an entirety of the main body.

6. The bracket of claim 4, wherein each of the tabs has a width along the lateral direction for only a portion of the entirety of the main body.

7. The bracket of claim 1, wherein the connector and main body form a corner, and further comprising at least one stiffener located along the corner.

8. The bracket of claim 7, wherein the at least one stiffener comprises a pair of stiffeners at the corner.

9. The bracket of claim 7, wherein the connector plate has a height along the vertical direction that is greater than a height of the main body along the vertical direction.

10. An oven appliance, comprising:
    a cabinet enclosing a cooking chamber for the receipt of food items for cooking, the cabinet defining lateral, transverse, and vertical directions mutually orthogonal to one another;
    a door for selectively accessing the cooking chamber, the door pivotally connected to the cabinet, the door defining an opening whereby the cooking chamber may be viewed from an exterior, the door having an interior surface and a pair of opposing sides extending along the vertical direction;
    a pane positioned at the opening, the pane having a bottom edge;

a pair of brackets positioned at the bottom edge of the pane, each bracket positioned along one of the opposing sides of the door, each bracket comprising a main body for positioning against the interior surface of the door;

a pair of opposing shelves located on opposing sides of the main body, each shelf projecting from one of the opposing sides along the transverse direction, at least one of the shelves contacting the bottom edge of the pane;

a pair of tabs located on opposing sides of the main body, each tab connected to one of the opposing shelves, each tab projecting along the vertical direction away from one of the shelves;

wherein the pair of tabs project away from the shelves within a common plane a connector plate attached to the main body and projecting along the transverse direction, the connector plate defining an aperture; and an anti-rotation tab attached to the connector plate and projecting along the lateral direction.

11. The oven appliance of claim 10, wherein each side of the door comprises an aperture into which the anti-rotation tab of one of the brackets is received.

12. The oven appliance of claim 10, wherein each tab is located adjacent to the bottom edge of the pane.

13. The oven appliance of claim 10, wherein each tab defines a gap between the tab and the pane.

14. The oven appliance of claim 10, wherein each of the shelves has a length that extends in the lateral direction along an entirety of the main body.

15. The oven appliance of claim 10, wherein the main body comprises a planar portion, wherein the pair of tabs are separated along the transverse direction by a distance $H_1$ from the planar portion of the main body, wherein the shelves extend along the transverse direction by an amount $H_2$, and wherein $H_1$ is greater than $H_2$.

* * * * *